US010754498B2

(12) United States Patent
Ouyang (10) Patent No.: US 10,754,498 B2
(45) Date of Patent: Aug. 25, 2020

(54) HYBRID IMAGE RENDERING SYSTEM (71) Applicant: AMAZON TECHNOLOGIES, INC., Seattle, WA (US)

(72) Inventor: Yin Ouyang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/213,817

(22) Filed: Dec. 7, 2018

(65) Prior Publication Data

US 2020/0183566 A1    Jun. 11, 2020

(51) Int. Cl.
| G06F 3/0481 | (2013.01) |
| G06T 15/06 | (2011.01) |
| G06T 15/50 | (2011.01) |
| G06T 7/73 | (2017.01) |
| H04N 13/111 | (2018.01) |

(52) U.S. Cl.
CPC ............ G06F 3/04815 (2013.01); G06T 7/73 (2017.01); G06T 15/06 (2013.01); G06T 15/50 (2013.01); H04N 13/111 (2018.05)

(58) Field of Classification Search
None
See application file for complete search history.

(56) References Cited

U.S. PATENT DOCUMENTS

| 6,111,582 A | 8/2000 | Jenkins | |
| 6,348,927 B1 * | 2/2002 | Lipkin | H04L 67/02 345/619 |
| 2004/0183451 A1 * | 9/2004 | D'Amora | G06T 15/50 315/100 |
| 2010/0079457 A1 | 4/2010 | Tavenrath | |
| 2010/0315423 A1 * | 12/2010 | Ahn | G06T 15/005 345/426 |
| 2014/0108915 A1 * | 4/2014 | Lu | G06F 17/2247 715/234 |
| 2017/0178400 A1 * | 6/2017 | Boulkenafed | H04N 19/426 |
| 2017/0180756 A1 * | 6/2017 | Tuffreau | G06F 17/5086 |
| 2018/0131788 A1 * | 5/2018 | Roberts | G06F 3/04815 |

(Continued)

OTHER PUBLICATIONS

Cornudet, Veronique, "Invitation to Pay Additional Fees dated Feb. 4, 2020", Patent Cooperation Treaty Application No. PCT/US2019/057294, Patent Cooperation Treaty, Feb. 4, 2020.

(Continued)

*Primary Examiner* — Ryan M Gray
(74) *Attorney, Agent, or Firm* — Lindauer Law, PLLC (57) ABSTRACT

A first computing device determines a scene graph that is representative of a three-dimensional scene that includes objects to be viewed from a specified virtual camera location. The scene graph is processed locally by the first computing device to generate a raster image. The scene graph is sent to a second computing device, such as a server, that processes the scene graph and generates illumination data. The illumination data may be indicative of brightness value for a given pixel that is representative of optical effects such as reflection, refraction, and so forth. The illumination data is received by the first computing device. The first computing device combines the raster image and the illumination data to produce an output image. The output image may then be presented using a display device.

20 Claims, 6 Drawing Sheets

(56) References Cited

U.S. PATENT DOCUMENTS

2018/0189987 A1* 7/2018 Powell ................... G06T 13/40
2019/0206114 A1* 7/2019 Baldwin ............... G06T 15/005

OTHER PUBLICATIONS

Sabino, Thales Luis Rodrigues, et al.; "A Hybrid GPU Rasterized and Ray Traced Rendering Pipeline for Real Time Rendering of Per Pixel Effects", International Conference on Financial Cryptograpy and Data Security, Section "4.2 Selection Graph"; Figures 1 and 4. Sep. 26, 2012, 14 pages.

Shi, Shu, et al., "A Survey of Interactive Remote Rendering Systems", ACM Computing Surveys, May 26, 2015, vol. 47, No. 4, pp. 1-29.

Flohr, Chantal, "Patent Cooperation Treaty International Search Report and Written Opinion dated Mar. 26, 2020," Patent Cooperation Treaty Application No. PCT/US19/57294, Patent Cooperation Treaty, dated Mar. 26, 2020.

\* cited by examiner

HYBRID IMAGE RENDERING SYSTEM

BACKGROUND

A user may view an image of an item on a computing device. The presentation of a photorealistic image to the user helps the user better visualize and appreciate the characteristics of the item. However, delays in the presentation of those photorealistic images may make it difficult for the user to interact with the representation. As a result, the user may not be able to obtain the information they want or need about the item.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A user may use a variety of different computing devices to view an item. For example, the user may use a website to shop for an item such as a chair. The website may provide photographs of the chair. These photographs may be helpful to the user, but do not help the user visualize how that item would look in particular surroundings and are limited to particular views based on where the camera was placed or where the image photograph was taken.

Described in this disclosure is a system and techniques for generating an output image that appears to be photorealistic, or nearly so, using at least two computing devices. This approach allows for the presentation of an output image to the user that is highly photorealistic while maintaining very low latency. This allows the user to quickly see a high-quality photorealistic image while facilitating user interaction with the image. For example, the user may provide input that changes the position of the point of view, zoom of the view, lighting conditions, and so forth.

During operation, a first computing device executes a web browser application. The web browser application accesses markup language data, such as a web page that is provided by a server. The markup language data may include instructions to provide a rendering of a scene that includes an object. For example, the markup language data may include information about a "chair" object that includes information about the size, geometry, surface, and so forth.

A browser engine processes the markup language data and generates a first scene graph. The first scene graph comprises first camera data that indicates where a virtual camera is located, the object, lighting data, and other information that describes the scene. The first scene graph is then sent from the first computing device to a second computing device.

The second computing device receives the first scene graph and uses a ray tracing algorithm to generate first illumination data that is indicative of intensity values of pixels in an image of the scene, whether the pixel is a specular or diffuse reflection, and so forth. Ray tracing is a technique that simulates how light interacts with surfaces. The ray tracing algorithm may calculate the path of a "view ray" from the virtual camera to the object and to a light source, and how that view ray interacts with a surface that it intersects.

The calculations involved in determining the path of the view ray are memory and processor intensive. To determine a photorealistic image, many view rays may be calculated, such as one view ray for each pixel in an image. The length of a view ray may also be specified. A view ray may reflect off of many different surfaces. With each reflection, the complexity of the calculation is increased. The complexity is further increased depending on the type of the surface. For example, an irregular surface may require more calculations than a smooth surface. Because of the computational costs and time needed to generate ray tracing data, ray tracing has either been limited to relatively low-resolution images or to lower fidelity situations that are less than photorealistic. For example, to reduce computational complexity the view ray may only be calculated for two reflections, which may produce a result that is less photorealistic than a more computationally intensive calculation of ten reflections.

Compared to the first computing device, the second computing device may have greater computational resources such as more memory, hundreds or thousands of graphic processing units (GPUs) that are optimized to perform ray tracing calculations, larger memory busses allowing for faster transfer of data between the memory and the GPUs, and so forth. As a result, the second computing device is able to produce illumination data with a photorealistic level of detail.

Meanwhile, the first computing device uses a rasterization algorithm to process the first scene graph to generate a first raster image. The first raster image provides a two-dimensional (2D) representation of the three-dimensional (3D) scene described by the first scene graph. In one implementation, the objects in the scene may be represented by a mesh of polygons. Vertices (or corners) of these polygons are associated with color values that describe the color of that vertex. The rasterization algorithm does not take into consideration lighting, shadows, shading, and so forth. As a result, the rasterization algorithm requires fewer computational resources than the ray tracing algorithm.

The rasterization algorithm may execute within the web browser application. For example, the rasterization algorithm may be implemented by using one or more application programming interface calls to the Web Graphics Library (WebGL) as developed by the Khronos WebGL Working Group. As described above, the rasterization algorithm does not consider effects such as lighting, shadows, shading, and so forth.

The first computing device receives the first illumination data from the second computing device. The first raster image and the first illumination data are used by the first computing device to determine the output image. For example, the determination of a color value for a particular pixel in the output image may be calculated by multiplying the color value in the first raster image for that pixel by the intensity value in the first illumination data that is associated with that pixel.

The output image may then be presented on a display device of the first computing device. By generating the first raster image locally on the first computing device and using a second computing device (or group of devices) to produce the first illumination data, the system is able to leverage the advantages of both computing devices to quickly produce a photorealistic output image.

Because the latency required to generate the output images is low, the system may be used to provide output images in an interactive presentation. For example, the user may provide input to change the location of the virtual camera, changing the point of view from which the object is being observed and creating second camera data. A second scene graph is generated that uses the second camera data, the object, the lighting data, and so forth.

A differential scene graph may be determined. For example, the differential scene graph may describe the differences between the first scene graph and the second scene graph. Continuing the example above, the differential scene graph may comprise a portion of the second camera data that differ from the first camera data. The differential scene graph may be sent to the second computing device. Use of the differential scene graph reduces the time and bandwidth needed for transmission to the second computing device because it contains less data than the first scene graph. As a result, overall latency of the system is reduced and performance is improved.

The second computing device may use the differential scene graph, in conjunction with the first scene graph, to construct the second scene graph. The second computing device then uses the second scene graph to generate second illumination data, which is then sent to the first computing device.

Meanwhile, the first computing device uses the second scene graph to determine a second raster image. The first computing device receives the second illumination data from the second computing device. The second raster image and the second illumination data are used by the first computing device to determine a second output image. The second output image may then be presented on the display device.

By using the system and techniques described in this disclosure, photorealistic renderings of a scene may be produced with very low latency. Users may be better able to visualize and interact with scenes that depict items. As a result, various activities such as planning where to place items in an environment, selecting an item for purchase, playing a game, and so forth are improved.

Illustrative System

Figure 1:
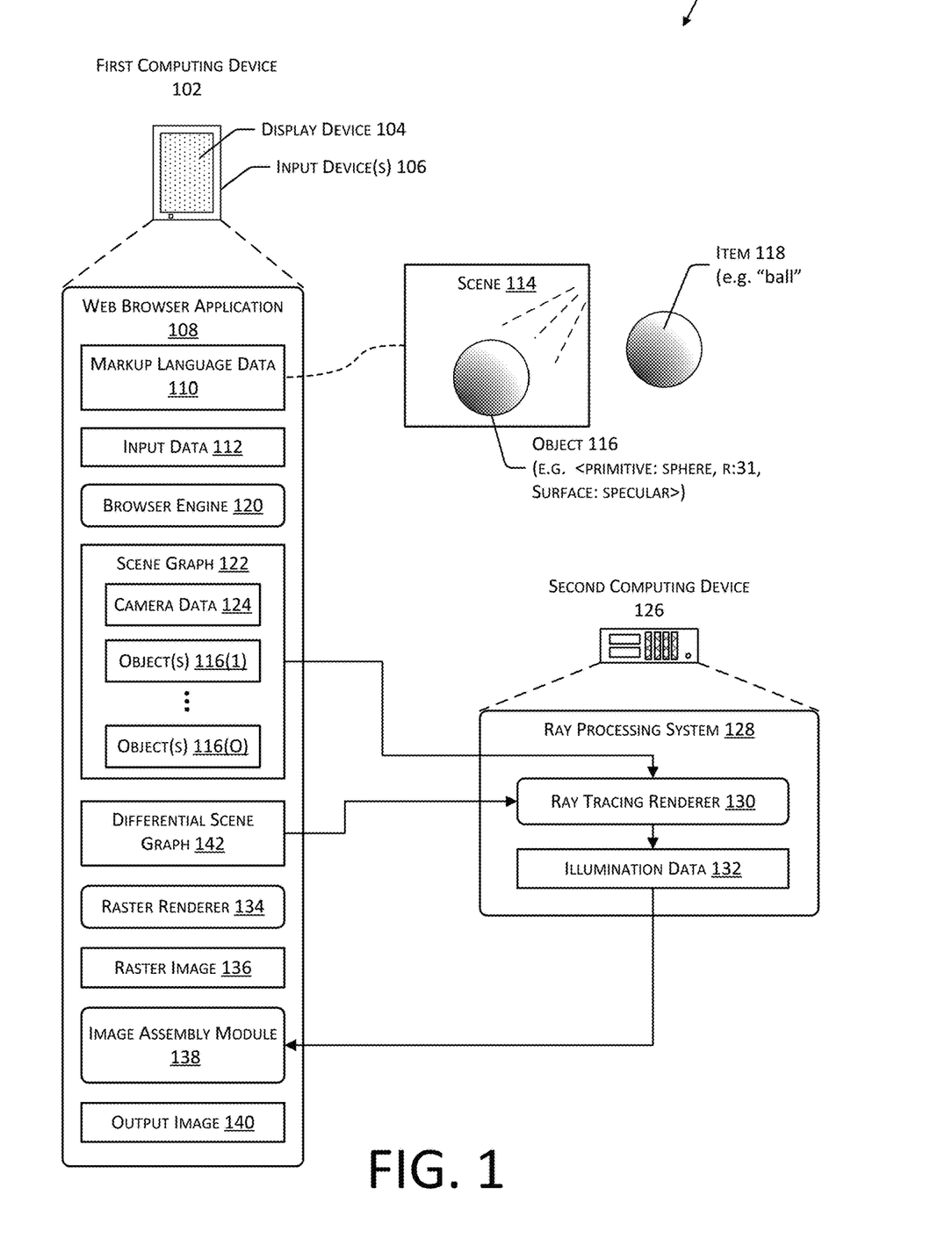
FIG. 1 illustrates a hybrid image rendering system, according to some implementations.

FIG. 1 illustrates a hybrid image rendering system 100, according to some implementations. A first computing device 102 is shown. For example, the first computing device 102 may be a smartphone, tablet, laptop, desktop, home appliance, in-vehicle information system, wearable device, and so forth. The first computing device 102 may include a display device 104 to produce output that is visible to a user. For example, the display device 104 may comprise a liquid crystal display, light emitting diode display, electrophoretic display, microelectromechanical system (MEMS) display, light projector, and so forth. The first computing device 102 may include one or more input devices 106. For example, the input devices 106 may include a touch sensor, accelerometer, gyroscope, button, microphone, camera, and so forth. Other components of the first computing device 102 are discussed in FIG. 4.

The first computing device 102 executes a web browser application (browser) 108. The web browser application 108 comprises one or more instructions that are executed by a hardware processor. During operation, the web browser application 108 processes markup language data 110 or other information. For example, the markup language data 110 may comprise hypertext markup language (HTML). The browser 108 may access markup language data 110 that is stored locally on the first computing device 102, or the markup language data 110 may be received from another computing device, such as a web server.

During operation of the first computing device 102, the input devices 106 may generate input data 112 that is indicative of input. For example, the input data 112 may be indicative of a keypress, rotation, touch, speech, and so forth. The input data 112 may be used to operate the browser 108. For example, the user may select a bookmark that represents a uniform resource locator (URL). The URL may then be used to access a web server and retrieve markup language data 110.

The markup language data 110 may include information that is representative of a scene 114. A scene 114 comprises a representation of one or more objects 116 in a three-dimensional (3D) space. In some situations, the object 116 may comprise data representative of an item 118 that exists in the real world. For example, the object 116 may comprise data that is representative of a ball that is an item 118 available for sale. Continuing the example, the object 116 may comprise a data structure that represents attributes of the item 118 that is being represented, such as geometry, size, surface, and so forth.

In other situations, the object 116 may comprise data representative of an item 118 that does not exist in the physical world. For example, the object 116 may comprise data that is representative of a concept car that has not yet been built. In this example, the object 116 may comprise a data structure that represents attributes of the item 118 if it were to have physical form.

A browser engine 120 comprises software that transforms the markup language 110 into a user interface. For example, the browser engine 120 may comprise the Blink browser engine as promulgated by the Chromium Project. For example, the browser engine 120 may be used to process the markup language data 110 and generate a scene graph 122. For example, the browser engine 120 may process tags present in the markup language data 110 and generate the scene graph 122. In other implementations the markup language data 110 may include the scene graph 122.

The scene graph 122 comprises a data structure of information that describes the scene 114. The scene graph 122 may include camera data 124, objects, 116, lighting data, and other data. For example, the camera data 124 may comprise information about a position within the scene 114 of a virtual camera or viewpoint, which direction the virtual camera is pointed, information such as a field of view of the virtual camera, and so forth. The scene graph 122 is discussed in more detail with regard to FIG. 2. In other implementations, other data structures may be used. For example, the scene 114 may be represented as data stored in a list.

The system processes the scene graph 122 to produce a photorealistic output image. An image may be deemed photorealistic when the interaction of light and simulated camera effects exhibits sufficient fidelity to be comparable to an actual photograph of the scene 114, if such a photograph were possible. For example, a photorealistic output image shows the objects 116 in the scene 114 as well as the interaction of the light that appears to illuminate the scene 114. In some implementations, a photorealistic image may be produced using unbiased rendering techniques which do not introduce a bias into radiance approximations. The resulting output does not include errors such as high-frequency noise that may blur the image.

The interaction between light and objects 116 in the scene 114 is computationally complex. Various factors including the position of the virtual camera, position of the object 116, type of surface of the object 116, number and location of light sources, and so forth are considered to determine information about the interaction of light and objects 116. Various techniques may be used to simulate these interactions. One technique for calculating these interactions is ray tracing. A ray tracing algorithm may calculate the path of a "view ray" from the virtual camera to the object 116 and to a light source, and how that view ray interacts with the surfaces it intersects.

The calculations involved in determining the path of the view ray and the intensity at points where it interacts with objects 116 are memory and processor intensive. To determine a photorealistic image, many view rays may be calculated, such as one view ray for each pixel in an image. The complexity increases as a view ray may reflect off of many different surfaces as it travels. With each reflection, the complexity of the calculation is increased. A longer view ray length produces more accurate data but requires more resources and time to calculate.

The complexity is further increased depending on the type of the surface. For example, an irregular surface may require more calculations than a smooth surface. In another example, the type reflection may change the intensity and direction the view ray. Continuing the example, a specular reflection (like a smooth surface) appears different from a diffuse reflection (like a brick) which is different from a mirror reflection (like a mirror).

Because of the large number of calculations and the large quantity of data that is involved in performing ray tracing, the computational costs are significant; and the time needed to perform the calculations has traditionally been prohibitive on computing devices not optimized for this function. For example, due to the processor, memory, and power limitations of the first computing device 102, the first computing device 102 may only be able to perform relatively low-resolution ray tracing and still require several seconds to provide ray tracing for a given scene graph 122.

In comparison, the system 100 described here divides the workload for rendering the scene graph 122 between the first computing device 102 and a second computing device 126.

The scene graph 122 is sent from the first computing device 102 to the second computing device 126. The second computing device 126 may be one or more computing devices that execute a ray processing system 128. The ray processing system 128 may comprise a ray tracing renderer 130. The ray tracing renderer 130 includes one or more of software or hardware that is optimized to perform ray tracing calculations. For example, the ray tracing renderer 130 may comprise hardware graphic processing units (GPUs) that are designed to perform ray tracing calculations and are in communication with memory via dedicated busses to store data associated with the ray tracing. In one implementation, the ray processing system 128 may implement the NVIDIA iRay software executing on Quadro GPUs from NVIDIA Corporation. The ray tracing renderer 130 accepts as input the scene graph 122 and performs ray tracing to determine illumination data 132. The illumination data 132 may comprise information that is indicative of intensity values for particular pixel locations in an image. For example, the illumination data 132 may comprise a two-dimensional matrix, with each cell in the matrix comprising an intensity value for that cell. Each cell in turn corresponds to a particular pixel in a raster image 136.

Returning to the first computing device 102, a raster renderer 134 uses a rasterization algorithm that executes within the web browser application 108 to process the scene graph 122 to determine a raster image 136. In one implementation, the raster renderer 134 may be a part of the Web Graphics Library (WebGL). The raster image 136 provides a two-dimensional (2D) representation of the three-dimensional (3D) scene 114 described by the scene graph 122. The raster renderer 134 does not consider effects such as lighting, shadows, shading, and so forth. Instead, the raster renderer 134 determines perspective effects, geometry of the object 116, which portions of an object 116 are visible or hidden by another object 116, and so forth.

In one implementation, the raster renderer 134 may represent the object 116 in the scene 114 using a mesh of polygons. Vertices (or corners) of these polygons are associated with color values that describe the color of that vertex. Compared to the ray tracing renderer 130, the raster renderer 134 requires fewer computational resources and is able to operate with low latency even in the constrained environment of the first computing device 102.

The illumination data 132 is received at the first computing device 102. An image assembly module 138 uses the illumination data 132 and the raster image 136 to determine the output image 140. For example, the determination of a color value for a particular pixel in the output image 140 may be calculated by multiplying the color value in the raster image 136 for that pixel by the intensity value in the illumination data 132 that is associated with that pixel. In another example, the determination of a color value for a particular pixel in the output image 140 may be calculated by adding the color value in the raster image 136 for that pixel to the intensity value in the illumination data 132 that is associated with that pixel.

In some implementations, the operation used to combine the color value and the intensity value may be based at least in part on the type of reflection associated with that pixel. For example, if the type of reflection is specular, the color value and the intensity value may be added. If the type of reflection is diffuse, the color value and the intensity value may be multiplied.

As described above, the first computing device 102 may have one or more input devices 106 that produce input data 112. This input data 112 may be indicative of actions to change one or more characteristics of the scene 114. For example, the user may wish to change the point of view of the virtual camera, change where a light source is, add or remove an object 116, and so forth. In other implementations, instead of or in addition to input from the user, a set of instructions or previously determined data may be used to change one or more characteristics of the scene 114. For example, the markup language data 110 may include an instruction to rotate the scene 114, without user input.

As described, the browser engine 120 may produce a scene graph 122 based on the markup language data 110 and the input data 112. As the one or more characteristics of the scene 114 change, a second scene graph 122(2) is generated.

A differential scene graph 142 may be determined. For example, the differential scene graph 142 may describe the differences between the first scene graph 122(1) and the second scene graph 122(2). The differential scene graph 142 is sent to the second computing device 126. The second computing device 126 may use the first scene graph 122(1) and the differential scene graph 142 to reconstruct the second scene graph 122(2). The second scene graph 122(2) as reconstructed, may then be processed by the ray tracing renderer 130 to generate second illumination data 132(2). The second illumination data 132(2) is then sent to the first computing device 102.

Use of the differential scene graph 142 reduces the time and bandwidth needed for transmission to the second computing device 126 because it contains less data than the first scene graph 122(1). As a result, overall latency of the system is reduced and performance is improved.

This second scene graph 122(2) may be processed by the raster renderer 134 to determine a second raster image 136(2). The image assembly module 138 uses the second illumination data 132(2) and the second raster image 136(2) to determine a second output image 140(2). The system is thus able to respond to changes in the scene graph 122, producing photorealistic output images 140 with low latency.

Figure 2:
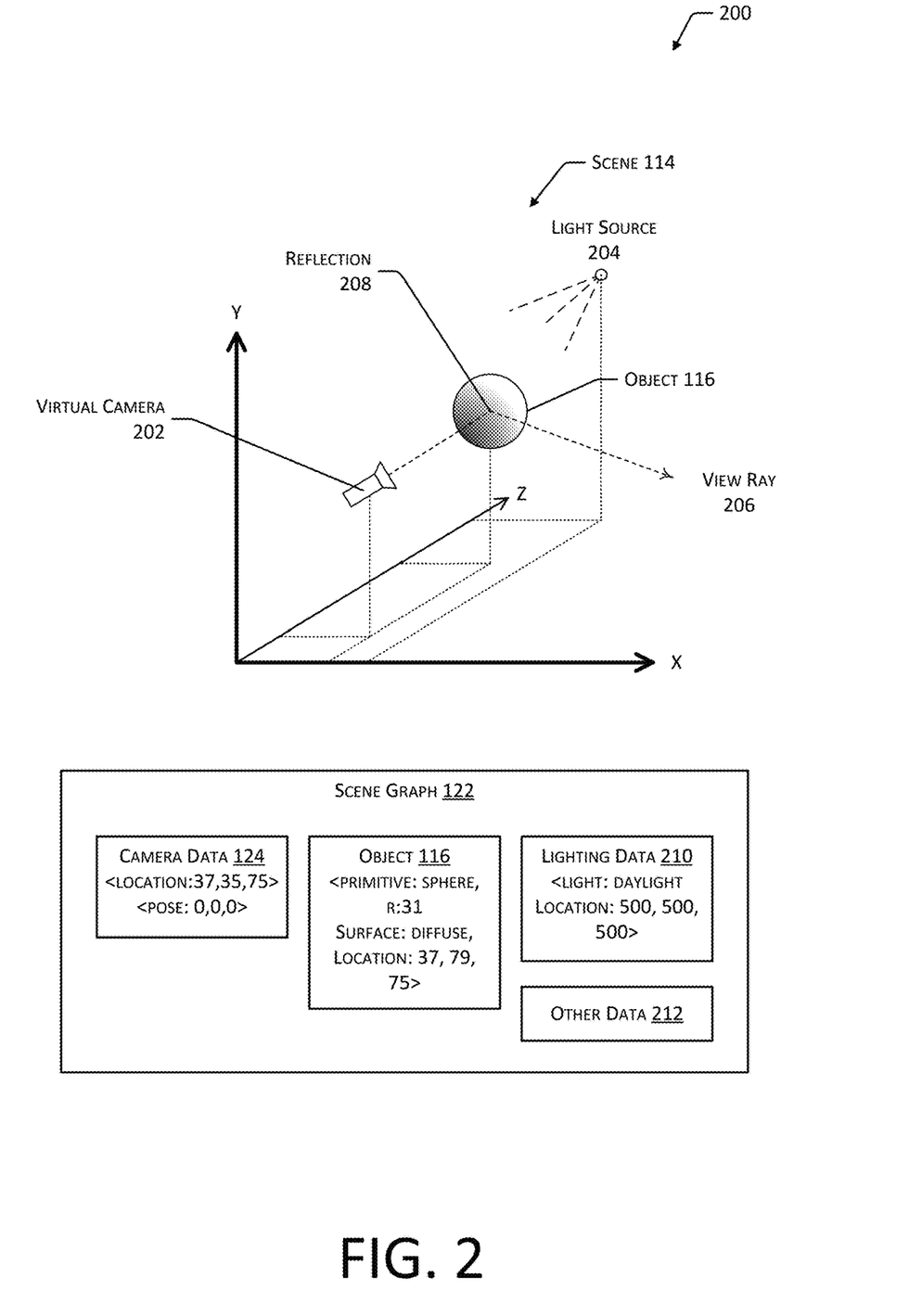
FIG. 2 illustrates various attributes of a scene and the scene graph that is used to render the scene, according to some implementations.

FIG. 2 illustrates at 200 various attributes of a scene 114 and the scene graph 122 that is used to render the scene 114, according to some implementations. The scene 114 is representative of a 3D space, indicated in this illustration by three mutually orthogonal axes X, Y, Z. The object 116 is shown at a first location in space while a virtual camera 202 is shown at a second location in space. In this illustration, the virtual camera 202 is oriented to point directly at the object 116. A single omnidirectional light source 204 is also shown.

A view ray 206 is depicted that extends from the virtual camera 202 to a point on the object 116. The view ray 206 interacts with the object 116 producing a reflection 208. A single view ray 206 is shown for clarity. During operation of the system, the ray tracing renderer 130 may determine a plurality of view rays 206 and generate illumination data 132 indicative of the respective reflections 208 of those view rays 206.

In one implementation the scene graph 122 may comprise the camera data 124, one or more objects 116, lighting data 210, and other data 212. The camera data 124 comprises information indicative of characteristics of the virtual camera 202, such as location in the 3D space, pose data that is indicative of angles with respect to the X, Y, and Z axes, field of view of the virtual camera 202, and so forth. The lighting data 210 provides information indicative of characteristics of the virtual light source 204. For example, the lighting data 210 may include a type of light, color temperature, directionality or solid angle of light emission, location in the 3D space, and so forth.

Figure 3:
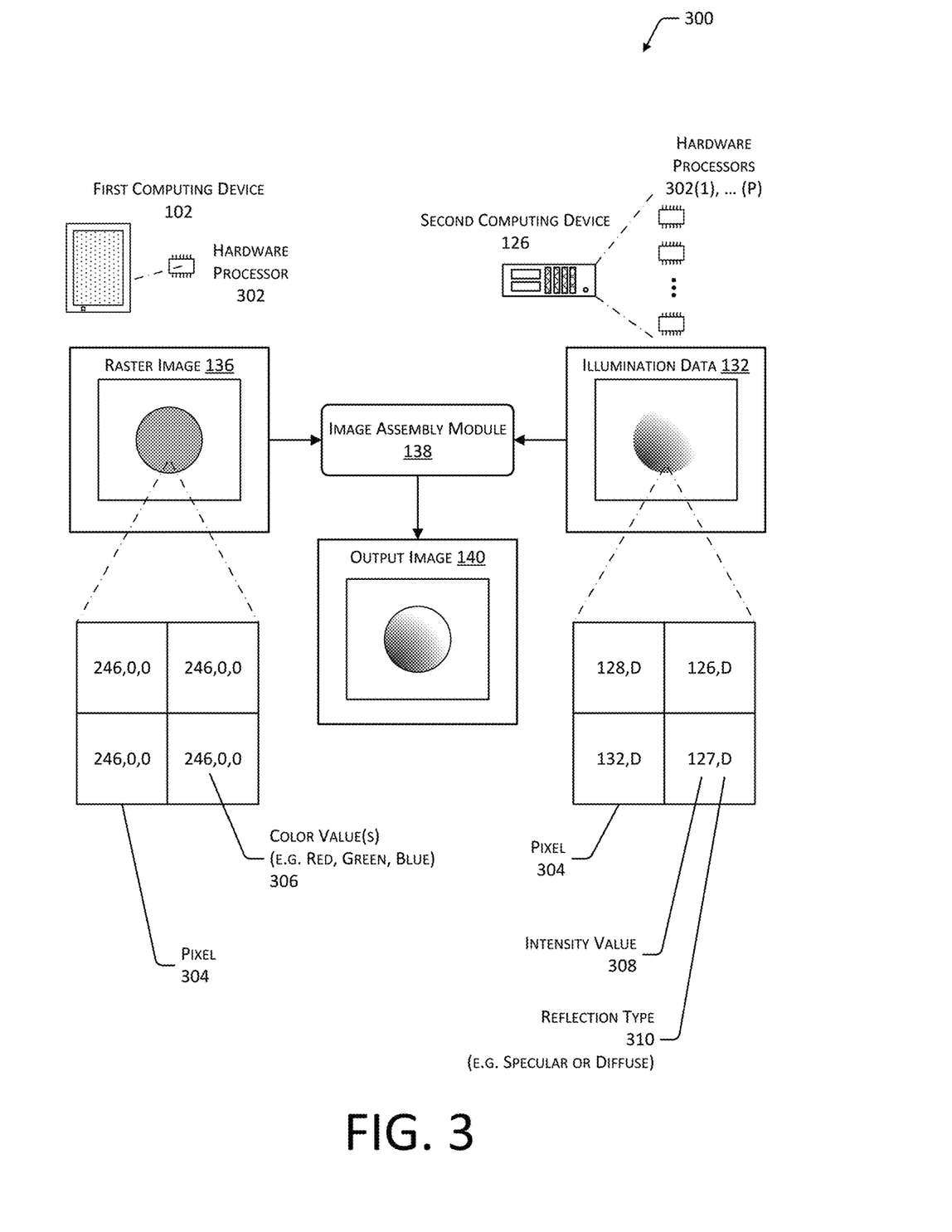
FIG. 3 illustrates a raster image and illumination data that are combined to form an output image, according to some implementations.

FIG. 3 illustrates a raster image 136 and illumination data 132 that are combined to form an output image 140, according to some implementations. In this figure the first computing device 102 is shown with a hardware processor 302.

For example, the hardware processor 302 of the first computing device 102 may comprise a central processing unit (CPU) that is designed to provide a variety of different computing tasks, such as a Qualcomm Snapdragon processor from Qualcomm Incorporated.

The first computing device 102 produces a raster image 136 that includes a plurality of pixels 304. Each pixel 304 has an associated color value 306. In this illustration, the color value 306 is expressed as 8-bit values for red, green, and blue (RGB). In other implementations other color depths may be used, such as 16-bit, 24-bit, and so forth. In other implementations, instead of using an RGB color expression, other systems such as hue, saturation, lightness (HSL) or hue, saturation, value (HSV) may be used.

The second computing device 126 may include a plurality of hardware processors 302(1), . . . , 302(P). At least some of these processors 302 may be optimized to perform ray tracing functions. For example, the second computing device 126 may include Quadro GPUs from NVIDIA Corporation. During operation, the ray tracing renderer 130 may send a set of instructions to the GPU. These instructions may direct the GPU to perform a ray tracing algorithm and generate illumination data 132.

The second computing device 126 produces illumination data 132 that includes a plurality of pixels 304 or an equivalent representation or association to pixels 304 in the raster image 136. For example, the illumination data 132 may comprise a matrix in which individual cells in the matrix correspond to particular pixels 304 in the raster image 136. The illumination data 132 may include, for each pixel 304, one or more of an intensity value 308 or a reflection type 310. The intensity value 308 is indicative of how much of the view ray 206 is directed to that pixel 304. The reflection type 310 is indicative of the type of reflection associated with that pixel 304. For example, the reflection type 310 may be mirror, specular, diffuse, and so forth.

As shown here, the raster image 136 looks "flat" in that it lacks shading or shadow features while the illumination data 132 depicts shading and shadows. When combined by the image assembly module 138, the resulting output image 140 provides a photorealistic image of the scene 114.

The operation used by the image assembly module 138 to combine the raster image 136 and the illumination data 132 may be based at least in part on the type of reflection associated with a given pixel 304. For example, if the type of reflection is specular, the color value 306 and the intensity value 308 for a given pixel 304 may be added. If the reflection type 310 is diffuse, the color value 306 and the intensity value 308 for a given pixel 304 may be multiplied. In other implementations other techniques may be used to determine the output image 140.

Figure 4:
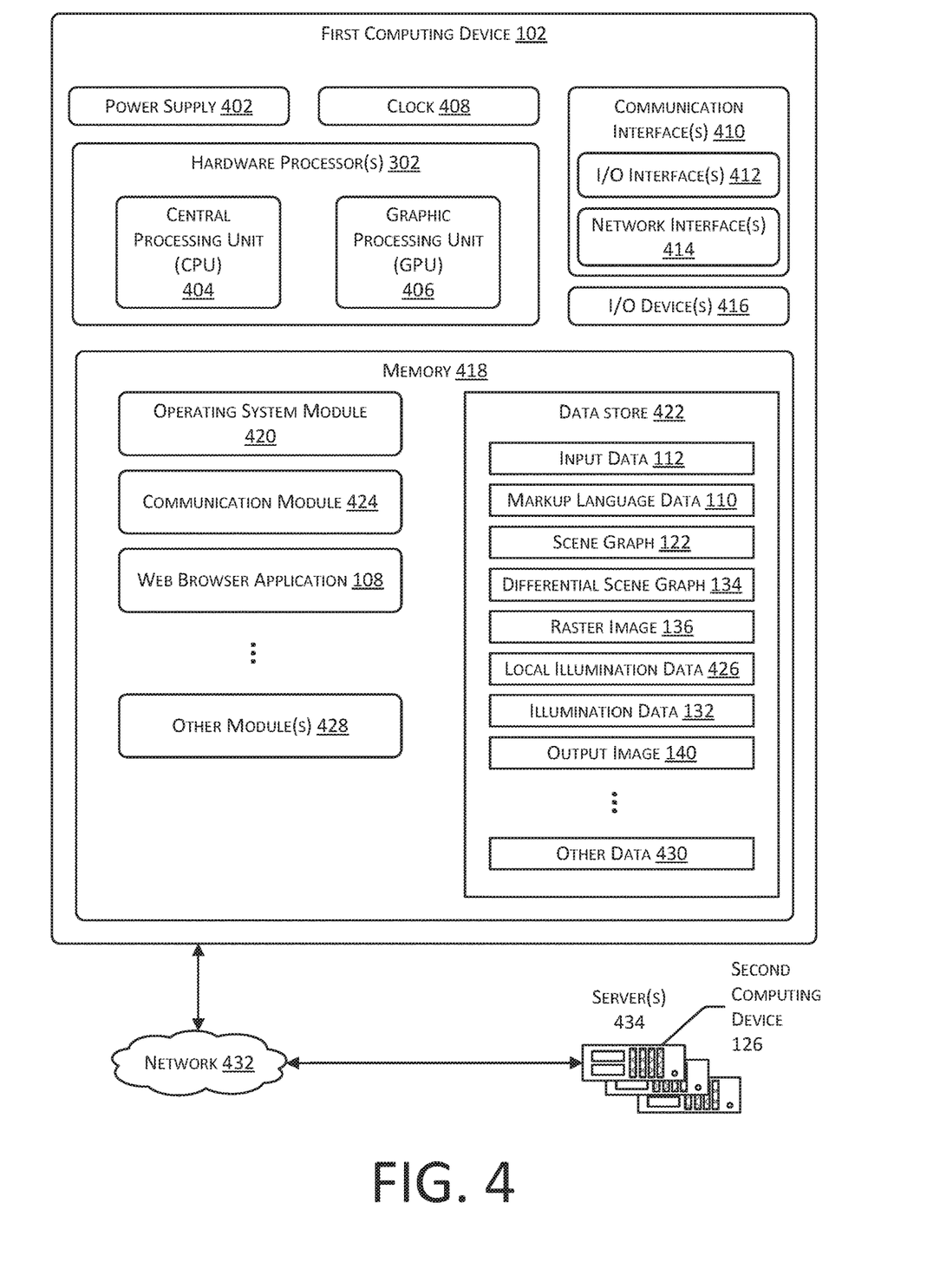
FIG. 4 is a block diagram of a computing device that implements a portion of the hybrid image rendering system, according to some implementations.

FIG. 4 is a block diagram 400 of the first computing device 102 that implements a portion of the hybrid image rendering system, according to some implementations. The first computing device 102 includes one or more of the following components. One or more power supplies 402 may be configured to provide electrical power suitable for operating the components in the first computing device 102. The one or more power supplies 402 may comprise batteries, capacitors, fuel cells, photovoltaic cells, wireless power receivers, conductive couplings suitable for attachment to an external power source such as provided by an electric utility, and so forth.

The first computing device 102 may include one or more hardware processors 302 (processors) configured to execute one or more stored instructions. For example, the processors 302 may include a central processing unit (CPU) 404 and a graphic processing unit (GPU) 406. The processors 302 may comprise one or more cores. The processors 302 may be of the same or different types or architectures. One or more clocks 408 may provide information indicative of date, time, ticks, and so forth.

The first computing device 102 may include one or more communication interfaces 410 such as input/output (I/O) interfaces 412, network interfaces 414, and so forth. The communication interfaces 410 enable the first computing device 102, or components thereof, to communicate with other devices or components. The communication interfaces 410 may include one or more I/O interfaces 412. The I/O interfaces 412 may comprise Inter-Integrated Circuit (I2C), Serial Peripheral Interface bus (SPI), Universal Serial Bus (USB) as promulgated by the USB Implementers Forum, RS-232, and so forth. The I/O interface(s) 412 may couple to one or more I/O devices 416. The I/O devices 416 may include input devices 106 such as one or more of a touch sensor, keyboard, mouse, microphone, camera, and so forth. The I/O devices 416 may also include output devices such as one or more of a display device 104, audio speakers, printer, and so forth. In some embodiments, the I/O devices 416 may be physically incorporated with the first computing device 102 or may be externally placed.

The network interfaces 414 may be configured to provide communications between the first computing device 102 and other devices, such as routers, access points, and so forth. The network interfaces 414 may include devices configured to couple to personal area networks (PANs), local area networks (LANs), wireless local area networks (WLANS), wide area networks (WANs), and so forth. For example, the network interfaces 414 may include devices compatible with Ethernet, Wi-Fi, Bluetooth, ZigBee, and so forth.

The first computing device 102 may also include one or more busses or other internal communications hardware or software that allow for the transfer of data between the various modules and components of the first computing device 102.

As shown in FIG. 4, the first computing device 102 includes one or more memories 418. The memory 418 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 418 provides storage of computer-readable instructions, data structures, program modules, and other data for the operation of the first computing device 102. A few example functional modules are shown stored in the memory 418, although the same functionality may alternatively be implemented in hardware, firmware, or as a system on a chip (SoC).

The memory 418 may include at least one operating system (OS) module 420. The OS module 420 is configured to manage hardware resource devices such as the I/O interfaces 412, the I/O devices 416, the communication interfaces 410, and provide various services to applications or modules executing on the processors 302. The OS module 420 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 418 may be a data store 422 and one or more of the following modules. These modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including servers, network attached storage devices, and so forth.

A communication module 424 may be configured to establish communications with external devices such as web servers, the second computing device 126, and so forth. The communications may be authenticated, encrypted, and so forth.

The web browser application 108 may also be stored within the memory 418.

In some implementations the first computing device 102 may generate local illumination data 426. For example, if the first computing device 102 is unable to establish communication with the second computing device 126, the local illumination data 426 may be generated. As described above, due to the constraints imposed by the first computing device 102, the local illumination data 426 may be of lesser fidelity. As a result, the output image 140 may not be photorealistic. In another example, if the first computing device 102 has not received the illumination data 132 from the second computing device 126 within a threshold time, the local illumination data 426 may be generated and used to determine the output image 140. If the illumination data 132 is subsequently received, a second output image 140 may be determined using the illumination data 132.

Other modules 428 may be stored in the memory 418 as well as other data 430. For example, the other modules 428 may include an augmented reality (AR) module that combines images obtained from the camera with output images 140 for presentation with the display device 104.

The first computing device 102 may utilize one or more of the communication interfaces 410 to access a network 432. For example, the network 432 may comprise a local area network, wide area network, and so forth. The network 432 may enable communication with the second computing device 126.

In some implementations, the second computing device 126 may include one or more of the components described above with respect to the first computing device 102. However, the configuration of the second computing device 126 may differ from the first computing device 102. For example, the second computing device 126 may include several hundred GPUs 406, larger bandwidth memory busses to provide for data transfer between GPUs 406 and memory 418, and so forth.

Figure 5A:
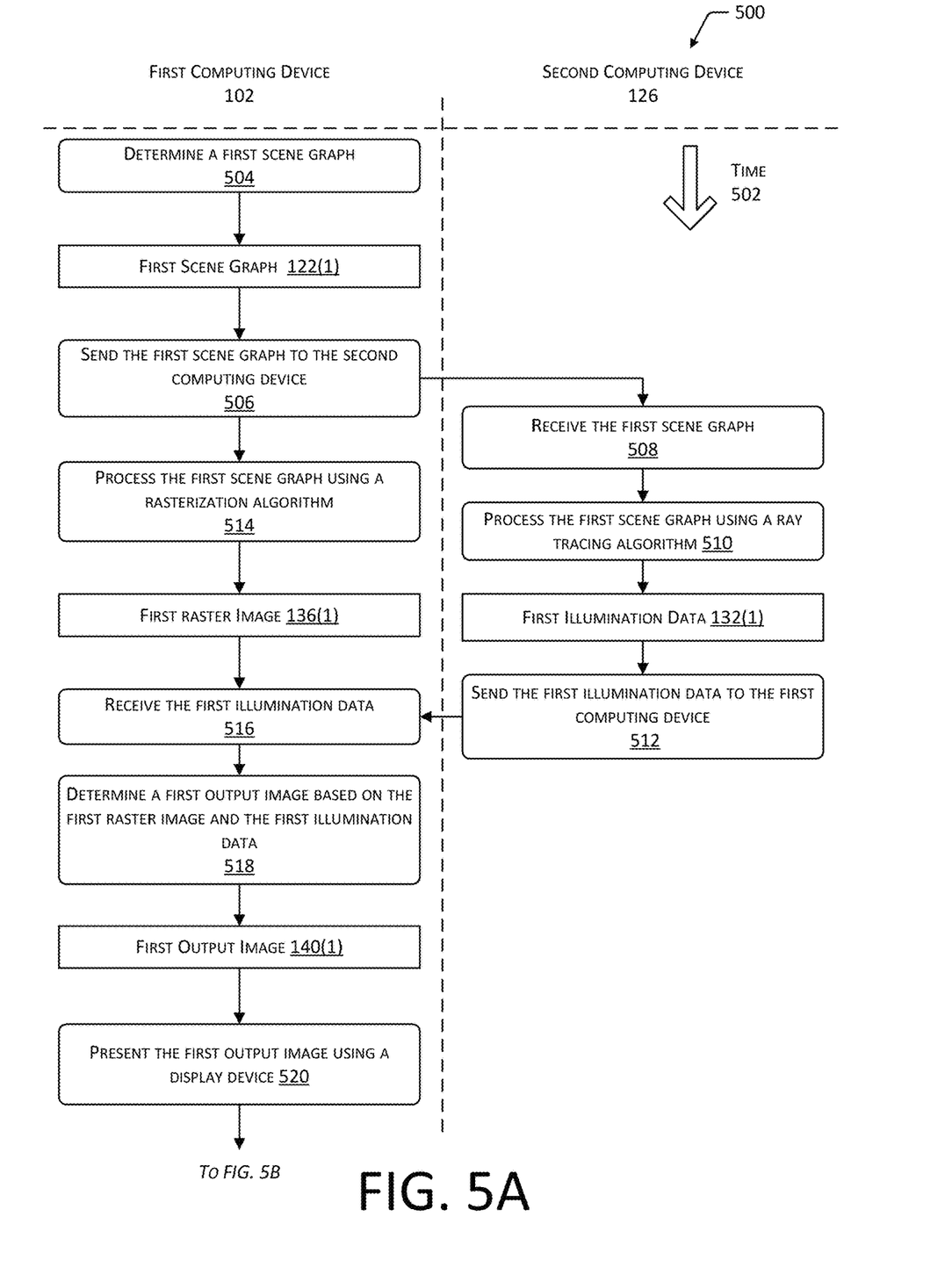
FIGS. 5A and 5B are a flow diagram of a process of hybrid image rendering, according to some implementations.
Figure 5B:
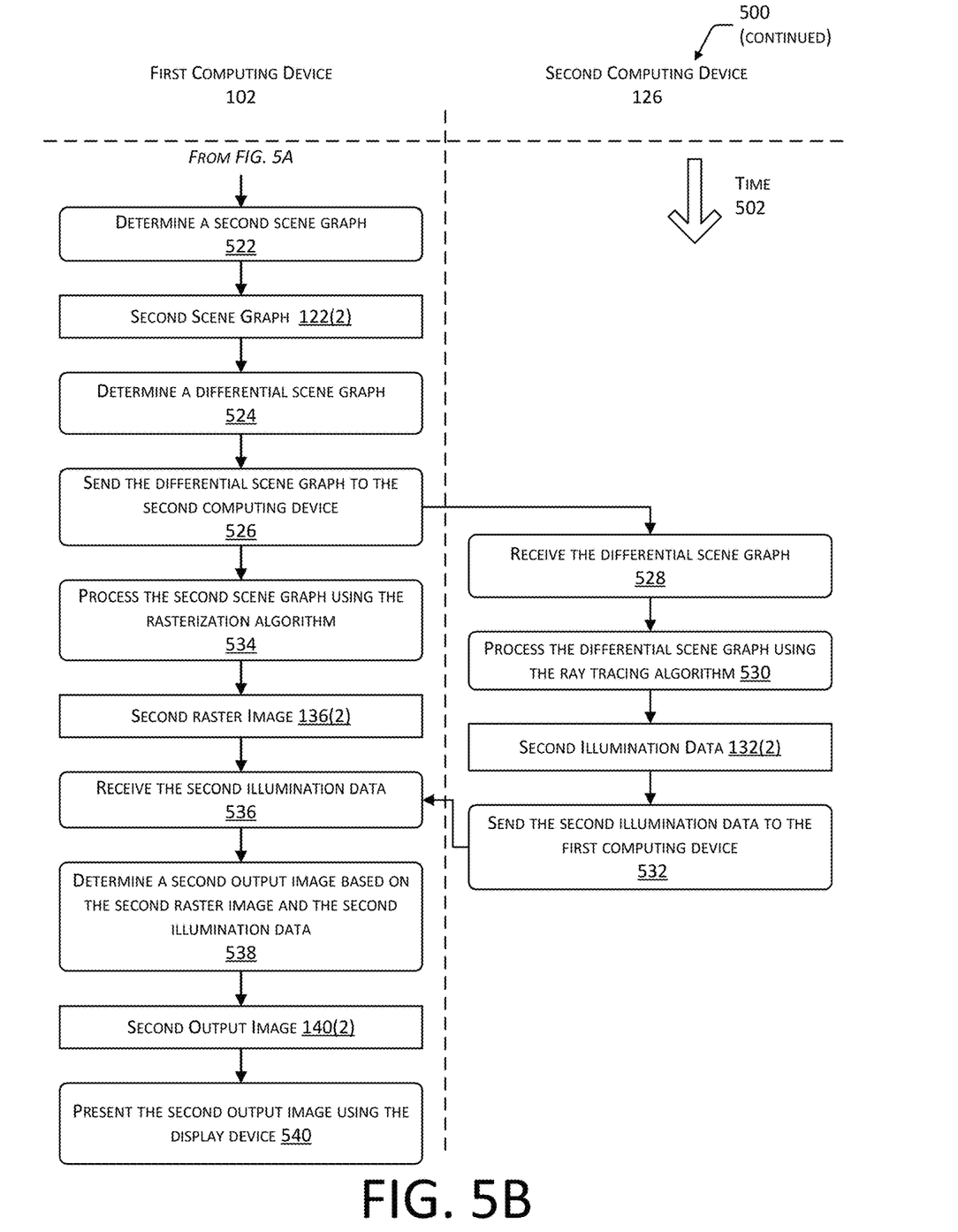

FIGS. 5A and 5B are a flow diagram 500 of a process of hybrid image rendering, according to some implementations. In these figures, time 502 increases down the page, with events shown at the top of the page occurring before those events shown at the bottom of the page. In other implementations, other sequences of events may be used.

At 504 the first computing device 102 determines a first scene graph 122(1). For example, the browser engine 120 may process the markup language data 110 received from a web server and produce the first scene graph 122(1) as output.

At 506 the first computing device 102 sends the first scene graph 122(1) to the second computing device 126. For example, the first computing device 102 may use the network interface 414 to send the first scene graph 122(1) to the second computing device 126 via the network 432.

At 508 the second computing device 126 receives the first scene graph 122(1).

At 510 the second computing device 126 processes the first scene graph 122(1) using a ray tracing algorithm. For example, the ray processing system 128 may use the ray tracing renderer 130 to determine the first illumination data 132(1). In one implementation the ray processing system 128 may support progressive rendering. For example, the ray processing system 128 may generate successive iterations of illumination data 132 with progressively greater detail, higher resolution, that utilize more computationally intensive techniques, and so forth. Continuing the example, a first iteration of illumination data 132 may be determined with a first resolution, a second iteration of illumination data 132 may be determined with a second resolution that is greater than the first, and so forth.

At 512 the second computing device 126 sends the first illumination data 132(1) to the first computing device 102. For example, the second computing device 126 may use a network interface 414 to send the first illumination data 132(1) to the first computing device 102 via the network 432.

Returning to the first computing device 102, at 514 the first scene graph 122(1) is processed using a rasterization algorithm to determine a first raster image 136(1). For example, the raster renderer 134 may use the first scene graph 122(1) as input to produce the first raster image 136(1).

At 516 the first computing device 102 receives the first illumination data 132(1) from the second computing device 126.

At 518 the first computing device 102 determines a first output image 140(1) based on the first raster image 136(1) and the first illumination data 132(1). For example, the image assembly module 138 may add the color values 306 and the associated intensity values 308 for pixels 304 to create the first output image 140(1). In implementations where progressive rendering is utilized, as successive iterations of illumination data 132 are received, the image assembly module 138 may produce successive output images 140 based on the raster image 136 and a latest iteration of the illumination data 132.

At 520 the first output image 140(1) is presented using the display device 102. For example, the first output image 140(1) may be shown within a graphical user interface on the display device 104.

At 522 the first computing device 102 determines a second scene graph 122(2). For example, input data 112 may be received, or an instruction may change one or more characteristics of the scene graph 122. Continuing the example, the location of the virtual camera 202 may be moved to provide a different point of view on the scene 114. As a result, the second scene graph 122(2) is determined that includes second camera data 124(2) that differs from first camera data 124(1) in the first scene graph 122(1).

At 524 the first computing device 102 determines a differential scene graph 142. The differential scene graph 142 provides information indicative of differences between the first scene graph 122(1) and the second scene graph 122(2). Continuing the example from above, the differential scene graph 142 may comprise a portion of the second camera data 124(2), such as the location and pose, that changed with respect to the first camera data 124(1).

At 526 the first computing device 102 sends the differential scene graph 142 to the second computing device 126.

At 528 the second computing device 126 receives the differential scene graph 142.

At 530 the second computing device 126 processes the differential scene graph 142 using the ray tracing algorithm. For example, the ray processing system 128 may use the first scene graph 122(1) and the differential scene graph 142 to reconstruct the second scene graph 122(2). The second scene graph 122(2) may then be used as input to the ray tracing renderer 130 to determine second illumination data 132(2).

At 532 the second computing device 126 sends the second illumination data 132(2) to the first computing device 102.

At 534 the first computing device 102 processes the second scene graph 122(2) using a rasterization algorithm to determine a second raster image 136(2). For example, the raster renderer 134 may use the second scene graph 122(2) as input to produce the second raster image 136(2).

At 536 the first computing device 102 receives the second illumination data 132(2) from the second computing device 126.

At 538 the first computing device 106 determines a second output image 140(2) based on the second raster image 136(2) and the second illumination data 132(2). For example, the image assembly module 138 use the color values 306 and the associated intensity values 308 to create the second output image 140(2).

At 540 the second output image 140(2) is presented using the display device 104. For example, the second output image 140(2) may be shown within a graphical user interface on the display device 104, superseding the first output image 140(1).

The second computing device 126 may use the first scene graph 122(1) and the differential scene graph 142 to reconstruct the second scene graph 122(2). The second scene graph 122(2) as reconstructed, may then be processed by the ray tracing renderer 130 to generate second illumination data 132(2). The second illumination data 132(2) is then sent to the first computing device 102.

In another implementation, the process may be performed on a single device. For example, the first computing device 102 may include GPUs 406 suitable to produce the illumination data 132. In this implementation, the web browser application 108 may utilize the GPUs 406 or other hardware to produce the illumination data 132, without accessing the second computing device 126.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a first communication interface;
a display device;
a first memory storing first computer-executable instructions; and
a first hardware processor to execute the first computer-executable instructions to:
determine first camera data that is representative of a first location of a camera with respect to a three-dimensional (3D) scene;
determine data indicative of one or more properties of a first object, wherein the first object is representative of a first item;
generate a first scene graph of the 3D scene comprising:
at least a portion of the first camera data; and
at least a portion of the data indicative of the one or more properties of the first object;
determine, using the first scene graph and a rasterization algorithm, a first pixel with a first color value and a second pixel with a second color value that are representative of the 3D scene as viewed from the first location of the camera;
send, using the first communication interface, the first scene graph to an external computing device for generation of illumination data;
receive, using the first communication interface, the illumination data from the external computing device, wherein the illumination data includes:
a first intensity value that is representative of an interaction between a first view ray and the first pixel; and
a second intensity value that is representative of an interaction between a second view ray and the second pixel;
determine a first output value by one or more of multiplying the first color value by the first intensity value or adding the first color value to the first intensity value;
determine a second output value by one or more of multiplying the second color value by the second intensity value or adding the second color value to the second intensity value;
determine an output image comprising a third pixel with the first output value and a fourth pixel with the second output value; and
present the output image using the display device.

2. The device of claim 1, further comprising second computer-executable instructions to:
execute a web browser application, wherein the first computer-executable instructions are executed by the web browser application.

3. The device of claim 1, further comprising:
an input device; and
computer-executable instructions to:
receive, using the input device, input indicative of a second location of the camera with respect to the 3D scene;
determine second camera data that is representative of the second location of the camera with respect to the 3D scene;
generate a second scene graph of the 3D scene comprising:
at least a portion of the second camera data; and
the at least a portion of the data indicative of the one or more properties of the first object; and
determine a differential scene graph that is representative of one or more differences between the first scene graph and the second scene graph;
send, using the first communication interface, the differential scene graph to the external computing device;
process the second scene graph using the rasterization algorithm to determine a third image that comprises a fifth pixel, wherein a color value is associated with the fifth pixel;
receive, using the first communication interface, second illumination data that comprises an intensity value associated with the fifth pixel;
determine, using the color value for the fifth pixel and the second illumination data, a second image comprising a sixth pixel; and
present the second image using the display device.

4. A system comprising:
a first computing device comprising:
a first communication interface;
a display device;
a first memory storing first computer-executable instructions; and
a first hardware processor to execute the first computer-executable instructions to:
determine a first scene graph comprising data indicative of a first object;
send, using the first communication interface, the first scene graph to a second computing device for generation of first illumination data based on the first scene graph;
process the first scene graph using a rasterization algorithm to determine a first image that comprises a first plurality of pixels, wherein one or more color values are associated with individual ones of the first plurality of pixels;
receive, using the first communication interface, first illumination data from the second computing device, wherein the first illumination data comprises individual intensity values that are associated with the individual ones of the first plurality of pixels;
determine, using the first image and the first illumination data, a second image comprising a second plurality of pixels; and
present the second image using the display device.

5. The system of claim 4, further comprising
second computer-executable instructions to:
execute a web browser application, wherein the first computer-executable instructions are executed by the web browser application.

6. The system of claim 4, the instructions to determine the second image using the first image and the first illumination data comprising instructions to:
add the color value and the individual intensity value that are associated with a same one of the first plurality of pixels.

7. The system of claim 4, the instructions to determine the second image using the first image and the first illumination data comprising instructions to:
multiply the color value and the individual intensity value that are associated with a same one of the first plurality of pixels.

8. The system of claim 4, wherein the first illumination data further comprises reflection data that is indicative of one or more of a specular reflection or a diffuse reflection associated with a first pixel of the first plurality of pixels; and
the instructions to determine the second image using the first image and the first illumination data further comprise instructions to:
perform one or more of an addition or a multiplication of the color value and the individual intensity value that are associated with the first pixel of the first plurality of pixels responsive to the reflection data associated with the first pixel of the first plurality of pixels.

9. The system of claim 4, wherein the first illumination data further comprises:
a specular reflection map that is indicative of a first set of the individual ones of the first plurality of pixels that are determined to be associated with a specular reflection; and
a diffuse reflection map that is indicative of a second set of the individual ones of the first plurality of pixels that are determined to be associated with a diffuse reflection.

10. The system of claim 4, further comprising first computer-executable instructions to:
determine a second scene graph comprising the data indicative of the first object;
determine a differential scene graph that is representative of one or more differences between the first scene graph and the second scene graph;
send, using the first communication interface, the differential scene graph to the second computing device;
process the second scene graph using the rasterization algorithm to determine a third image that comprises a third plurality of pixels, wherein the one or more color values are associated with individual ones of the third plurality of pixels;
receive, using the first communication interface, second illumination data that comprises individual intensity values that are associated with individual ones of the third plurality of pixels;
determine, using the third image and the second illumination data, a fourth image comprising a fourth plurality of pixels; and
present the fourth image on the display device.

11. The system of claim 4, further comprising:
the second computing device, wherein the second computing device comprises:
a second communication interface;
a second memory storing second computer-executable instructions; and
a second hardware processor to execute the second computer-executable instructions to:
receive, using the second communication interface, the first scene graph from the first computing device;
process the first scene graph using a ray tracing algorithm to determine the first illumination data; and
send, using the second communication interface, the first illumination data to the first computing device.

12. The system of claim 4, further comprising:
the second computing device, wherein the second computing device comprises:
a second communication interface;
a graphic processing unit;
a second memory storing second computer-executable instructions; and
a second hardware processor to execute the second computer-executable instructions to:
receive, using the second communication interface, the first scene graph from the first computing device;
determine, using the first scene graph, a first set of instructions for the graphic processing unit;
send the first set of instructions to the graphic processing unit;
receive the first illumination data from the graphic processing unit; and
send, using the second communication interface, the first illumination data to the first computing device.

13. The system of claim 4, wherein the rasterization algorithm is executed within a web browser application.

14. A method comprising:
determining, within a web browser application executing on a first device, a first scene graph comprising data indicative of a first object;
sending the first scene graph to a second device for generation of first illumination data;
processing, within the web browser application executing on the first device, the first scene graph to determine a first image comprising a rasterized representation of the first scene graph;
receiving, within the web browser application executing on the first device, the first illumination data from the second device;
determining, within the web browser application executing on the first device, a second image that is based on the first image and the first illumination data; and
presenting the second image on a display device of the first device.

15. The method of claim 14, wherein the first illumination data includes information indicative of whether a particular pixel in the first image is associated with one or more of a specular reflection or a diffuse reflection.

16. The method of claim 14, wherein the first illumination data comprises:
   a specular reflection map that is indicative of a first set of pixels in the first image that are determined to be associated with a specular reflection; and
   a diffuse reflection map that is indicative of a second set of pixels in the first image that are determined to be associated with a diffuse reflection.

17. The method of claim 14, wherein:
   the first image comprises a first plurality of pixels with one or more first color values associated with individual ones of the first plurality of pixels;
   the first illumination data comprises individual intensity values that are associated with the individual ones of the first plurality of pixels;
   the second image comprises a second plurality of pixels that is based on the first image; and
   the determining the second image comprises one or more of adding or multiplying the first color value and the individual intensity value that are associated with a same one of the first plurality of pixels to create a second color value that is associated with a corresponding one of the second plurality of pixels.

18. The method of claim 14, the first illumination data comprising reflection data that is indicative of one or more of a specular reflection or a diffuse reflection associated with individual pixels in the first image; and
   the determining the second image comprising:
   performing one or more of an addition or a multiplication of a color value of a first pixel in the first image and an individual intensity value associated with the first pixel responsive to the reflection data associated with the first pixel.

19. The method of claim 14, further comprising:
determining, within the web browser application executing on the first device, a second scene graph comprising the first object;
determining, within the web browser application executing on the first device, a differential scene graph that is representative of one or more differences between the first scene graph and the second scene graph;
sending the differential scene graph to the second device;
processing, within the web browser application executing on the first device, the second scene graph to determine a third image comprising a rasterized representation of the second scene graph;
receiving, within the web browser application executing on the first device, second illumination data;
determining, within the web browser application executing on the first device, a fourth image that is based on the third image and the second illumination data; and
presenting the fourth image on a display device of the first device.

20. The method of claim 14, further comprising:
receiving, at the second device, the first scene graph;
processing the first scene graph using a ray tracing algorithm to determine the first illumination data; and
sending the first illumination data to the first device.

* * * * *